United States Patent [19]

Larsson

[11] Patent Number: 4,551,915

[45] Date of Patent: Nov. 12, 1985

[54] METHOD FOR TERMINATING A HIGH VOLTAGE CABLE

[75] Inventor: Peter L. Larsson, Mountain View, Calif.

[73] Assignee: Raychem Corporation, Menlo Park, Calif.

[21] Appl. No.: 483,007

[22] Filed: Apr. 6, 1983

[51] Int. Cl.[4] .............................................. H01R 43/00
[52] U.S. Cl. ..................................... 29/858; 174/73 R
[58] Field of Search ......................... 29/858, 859, 828; 174/73 R, 84 R

[56] References Cited

U.S. PATENT DOCUMENTS

| | | | |
|---|---|---|---|
| 3,066,180 | 11/1962 | Virsberg et al. | 174/73 SE X |
| 3,210,460 | 10/1965 | Suelmann | 174/73 R |
| 3,317,655 | 5/1967 | Oatess et al. | 29/828 X |
| 3,816,639 | 6/1974 | Anderson et al. | 174/73 R |
| 4,159,860 | 7/1979 | Broad | 174/73 R X |
| 4,431,861 | 2/1984 | Clabburn et al. | 29/859 X |

FOREIGN PATENT DOCUMENTS

| | | | |
|---|---|---|---|
| 2263909 | 10/1973 | Fed. Rep. of Germany | 174/73 R |
| 2312128 | 12/1976 | France | 174/73 R |

Primary Examiner—Howard N. Goldberg
Assistant Examiner—Carl J. Arbes
Attorney, Agent, or Firm—Edith A. Rice; Herbert G. Burkard

[57] ABSTRACT

An arrangement and method to control electrical stress in a region of high electric field strength associated with high voltage equipment, such as cable terminations and joints, includes a semiconductive layer of stress control material and a electrically conductive layer positioned over and in electrical contact with said semiconductive layer in the region of highest electrical stress associated with a discontinuity in the electric field of the equipment. The combination of the conductive layer and the semiconductive stress control layer improves the discharge extinction and the impulse performance of the electrical equipment with which it is used.

3 Claims, 3 Drawing Figures

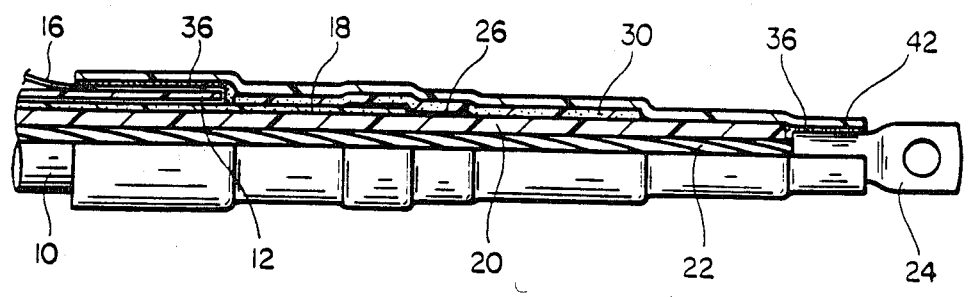
FIG_1
(PRIOR ART)
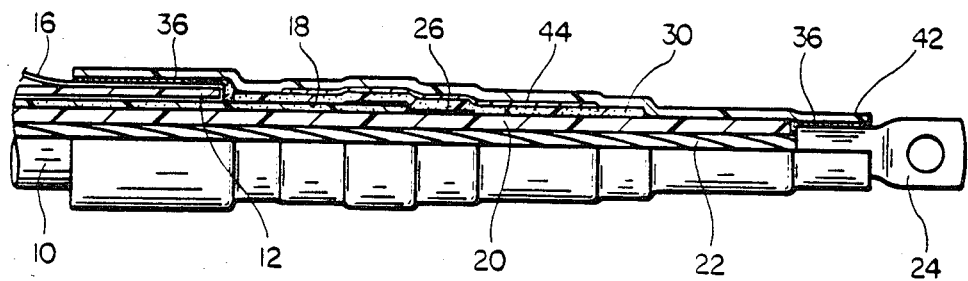
FIG_2
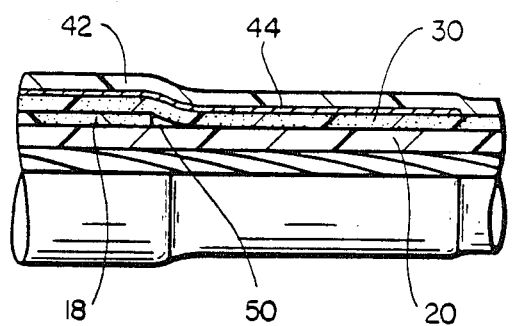
FIG_3

METHOD FOR TERMINATING A HIGH VOLTAGE CABLE

TECHNICAL FIELD

The present invention relates to electrical stress control and more particularly to a method and an arrangement to control electrical stress in a region of high electric field strength associated with high voltage electrical equipment.

BACKGROUND OF THE INVENTION

It is well known to employ stress control means to control electrical stress due to a discontinuity in a region of high electric field strength high voltage electrical equipment, for example, electrical bushings, and joints or terminations of high voltage cables. Such stress control means typically comprise, stress cones and tapes or tubular articles of semiconductive stress control material. This invention is directed to stress control means comprising semiconductive stress control material and provides improved discharge extinction and impulse performance over prior art arrangements using such stress control means. For purposes of illustration, this invention is described primarily as it applies to a termination of a high voltage cable. The invention can be applied, however, to other electrical equipment where stress control is desired.

A typical high voltage cable includes an inner conductor surrounded by a conductor shield which is, in turn, surrounded by an insulating material that is surrounded by an outer electrically conductive shield and metal shield. The cable, typically also includes an outer protective cable jacket. In terminating such a cable, it is customary to remove or cut back each successive layer of the cable to expose the layer below. Cutting back the electrically conductive shield causes a discontinuity in the electric field resulting in high electric stress at the end of the shield. The high electrical stress can cause electrical discharges to occur, which in turn tend to cause breakdown of the insulation of the cable. The high electrical stress can be controlled by electrical stress control means.

High-voltage alternating-current cable terminations are generally tested in the U.S. under the IEEE standard test procedure Std. 48-1975. This procedure sets forth, inter alia, design tests to be performed by the manufacturer to obtain information on the performance of a high voltage cable termination.

The design tests of the IEEE procedure that are particularly useful in determining the effectiveness of a termination which includes a stress control arrangement include the "Partial Discharge (Corona) Extinction Voltage Test" and the "Lightning Impulse Voltage Withstand Test". In the discharge extinction voltage test, electrical discharge in the termination is measured at specific applied voltages and has to be below specific values. Also the voltage at which the discharge extinguishes is measured and has to be above specific values. In the impulse voltage withstand test, impulses of specific value and waveform are applied to the cable and should be withstood without flashover. The voltage at which flashover occurs should be above specific values. Both the discharge and impulse performance of the termination should meet the requirements set forth in the IEEE Standard Test procedures STD 48-1975.

The use of semiconductive stress control material in high voltage cable terminations does not always produce termination that meets the impulse performance requirements of the IEEE test procedures. In order to meet this requirement the stress control arrangement may be augmented by the use of sheds. While sheds are typically employed with outdoor terminations for other purposes, they are not generally employed when the cable termination is installed indoors. Since the use of sheds adds to the cost of the termination and requires additional space around the cable, it is desirable to be able to dispense with the use of the sheds yet still meet the desired impulse performance.

The present invention, provides a novel arrangement and method that retains the the electrical stress control capabilities of the semiconductive stress control material while significantly improving both its discharge and impulse performance without the use of sheds. While the present invention is primarily described in connection with a termination of a cable, it is suitable for employment with high voltage cable joints and other high voltage equipment including electrical bushings and feed throughs.

SUMMARY OF THE INVENTION

Accordingly, it is an object of the present invention to provide a method and an arrangement to control electrical stress due to a discontinuity in a region of high electric field strength associated with high voltage equipment.

It is a feature of the present invention that it improves the performance of a semiconductive stress control material.

It is an advantage of the present invention that it may be employed in connection with high voltage equipment such as terminations or joints of cables, electrical bushings and feed throughs.

In accordance with one aspect of the present invention, there is provided a method of controlling electrical stress due to a discontinuity in a region of high electric field strength which comprises:

(a) applying a semiconductive layer of stress control material over the region of high electric field strength; and (b) placing a conductive layer on the outer surface of the semiconductive layer positioned such that the conductive layer overlies the discontinuity and extends therefrom a predetermined distance.

BRIEF DESCRIPTION OF THE DRAWING

These and other features of the present invention will be more clearly understood from a consideration of the following description taken in connection with the accompanying drawings in which:

FIG. 1 provides a cross-sectional view of a terminated high voltage cable that does not incorporate the arrangement of the present invention; and FIG. 2 provides a cross-sectional view of a terminated high voltage cable that does incorporate the arrangement of the present invention.

FIG. 3 shows an additional feature of this invention in which the discharge extinction voltage performance of a termination is improved.

DETAILED DESCRIPTION OF THE INVENTION

The method and arrangement of the present invention controls electrical stress due to a discontinuity in a region of high electric field. A detailed description of the present invention is provided with reference to FIGS. 1 and 2 which show cross-sectional views of a termination of a high voltage cable. It is appreciated, however, that the invention may be readily adapted for application to high voltage cable joints and high voltages equipment other than cables, including e.g. electrical bushings and feed throughs. The term "high voltage" is used herein to mean voltages in the range of at least about 5 kilovolt (kV) and typically in the range of about 12 to about 138 kV.

Accordingly, attention is directed to FIG. 1 which shows a cross-sectional view of a terminated high voltage cable 10 that does not incorporate the arrangement of the present invention. In this embodiment, the cable 10, a 25 kV cable insulated with cross-linked polyethylene, is terminated in a known manner. The cable jacket 12 is cut back a predetermined amount, leaving an exposed shield portion 18. The shield portion 18 includes a plurality of shielding wires 16 that provide a metal shield for the cable 10. The wires 16 are bent back over the jacket 12 and are formed into a pigtail for convenient earthing. A remaining exposed shield portion 18 comprises an extruded layer of a conductive polymeric material. The plastic cable insulation layer 20 is also cut back, but to a lesser extent than the shield 18, to expose a predetermined length of the end of the cable conductor 22, so that an appropriate connector 24 may be crimped thereto.

In order to complete the termination, a layer of conductive paint 26 (or grease or other void filler) is applied over the exposed shield 18. Then a layer 30 of semi-conductive stress control material is positioned over the exposed cut back portion of the insulation layer 20 and it extends over the exposed shield portion 18. The semi-conductor stress control layer 30 used in this embodiment is about 2 millimeters (mm) thick.

Examples of semiconductive stress control materials suitable for use in the method and arrangement of the invention include: an electrically insulating polymeric material that contains carbon black; a material comprising iron oxide; a material comprising zinc oxide; a material comprising silicon carbide; a polymeric material disclosed in UK Patent Specification Nos. 1470504 or 1470501, the disclosures of which are incorporated herein by reference. Semiconductive stress control materials typically have a specific impedance at 60 Hertz in the range from about $10^6$ ohm-cm to about $10^{10}$ ohm-cm, preferably from about $5 \times 10^7$ ohm-cm to about $5 \times 10^9$ ohm-cm and most preferably from about $10^8$ ohm-cm to $10^9$ ohm-cm. The semiconductive stress control layer generally has a thickness of from about 0.5 to about 5 mm, preferably from about 1 to about 3 mm. The semiconductive stress control layer 26 may be provided by a heat shrinkable tube positioned over the end of the cable 10 and heated to cause it to shrink into contact with the cable as indicated. A suitable material of this type is available from the Raychem Corporation, Menlo Park, Calif., under its trademark SCTM.

The termination is completed by applying a mastic 36 over the conductor 22 and shielding wires 16 as shown and then applying a layer 42 of insulating material over the entire assembly. The layer 42 is preferably a non-tracking polymeric material. Non-tracking (also referred to as anti-tracking) materials typically comprise polymeric materials containing an additive such as alumina trihydrate to improve the anti-tracking properties. Examples of non-tracking materials can be found in U.S. Pat. Nos. 4,100,089, 4,189,392 and 4,198,310 and UK Pat. No. 1,337,951 the disclosures of which are incorporated herein by reference. The layer 42 can be applied in the form of a heat shrinkable tube such as that available from the Raychem Corporation, Menlo Park, Calif., under its Trademark HVTM.

The terminated cable 10 discussed with reference to FIG. 1 (which does not include the improvement of the present invention) was subjected to discharge and impulse tests in accordance with IEEE Std. 48-1975. For each sample prepared, its discharge performance was tested by applying AC voltages of different, decreasing values to the termination and measuring the consequent discharge value. The extinction voltage (DEV) at which no discharge could be detected was also noted. The impulse behavior was tested by applying increasing impulse voltages to the termination, of postive polarity and of negative polarity, and noting the voltage at which flashover occurred. The values reported below were the average of 10 impulses of positive polarity and 10 impulses of negative polarity. Typical requirements for the cable 10, as provided in the aforementioned IEEE standards, are that the discharge extinction voltage should exceed 21 kV, and that flashover should not occur below 150 kV. The results are set forth in the following Table 1 and it is noted that not all of the samples fall within the standards.

Samples were prepared for this test using stress control layers applied as heat-shrinkable tubing commerically available from Raychem Corporation as SCTM. Stress control layer #1 was applied as a heat shrink tubing having an internal diameter of 19 mm in its freely recovered configuration while stress control layer #2 had an internal diameter of 14 mm in its freely recovered state. Both stress control tubes recovered into intimate contact with the cable 10.

TABLE 1

| Control | Stress Control | FOV | DEV |
| --- | --- | --- | --- |
| 1 | #1 | 120 kV | >21 kV |
| 2 | #2 | 125 kV | >21 kV |

It is at this point that the present invention provides a radical advance in the art by providing an electrically conductive layer of material 44 over a portion of the semiconductive stress grading material 30. As shown in FIG. 2 (and with continued reference to FIG. 1), the present invention may be realized by terminating the cable 10, in the manner indicated above, and further including (before the step of positioning the heat shrinkable tube 42 over the entire assembly) a step of providing the electrically conductive layer of material 44 over a portion of the semiconductive stress control material 30. As illustrated in FIG. 2, the material overlies the cut back of the shield 18, i.e. the point of highest stress, and extends approximately 25 mm from the cutback in each direction. The conductive layer should extend from the area of highest electrical stress a predetermined distance. Generally, this distance should be about 10 times the thickness of the stress control layer. Preferably this distance is from about 10 times to about 30 times the thickness of the stress control layer. For example, where the stress control layer has a thickness of 2 mm, as in this embodiment, the conductive layer should extend in the region of high electric stress for a distance of at least 20 mm from the point of highest stress.

The terminated cable 10 in accordance with the present invention was subjected to the AC discharge and impulse tests. The results are set forth in the following Table 2:

TABLE 2

| Sample | Stress Control | FOV | DEV |
| --- | --- | --- | --- |
| 1 | #1 | 155 kV | >21 kV |
| 2 | #1 | 155 kV | >21 kV |
| 3 | #1 | 220 kV | >21 kV |
| 4 | #2 | 240 kV | >21 kV |
| Control 1* | #1 | 120–125 kV | >21 kV |
| Control 2* | #2 | 120 kV | >21 kV |

*from Table 1

By comparing the above data, it can be seen that the arrangement of the present invention significantly improves the impulse performance of the cable termination and retains the desired discharge performance. While neither of the control samples (without the conductive layer) passed the 150 kV withstand requirement of the IEEE test, all samples with the conductive layer exceeded 150 kV before flashover occurred. Consequently, the employment of the arrangement of the present invention dispenses with the necessity for providing additional arrangements such as sheds in order to improve the performance of semiconductive stress control materials.

It has also been found that a joint or termination utilizing this invention has significantly improved discharge extinction voltage ratings if a void filling composition is applied to the end of the cutback of the cable shield. This is illustrated in FIG. 3 wherein the semiconductive stress control layer 30, is positioned over the cable shield 18 and insulation layer 20 creating a void 50. In accordance with this invention, conductive layer 44 is positioned over the semiconductive stress control layer as shown. The void 50 can be filled in with a suitable void filling composition for example with an epihalohydrin-based composition such as that described in UK Pat. No. 1,601,612, the disclosure of which is incorporated by reference. Terminations with and without a void filler and with and without a conductive layer 44 in accordance with this invention were tested using the procedure of IEEE td. 448-1975, outline above, to illustrate the improved discharge extinction voltage when the void filler is used in conjuction with the conductive layer 44. For these tests the samples were prepared using 15 kV cable. For terminations on 15 kV cables the IEEE Standard calls for the discharge extinction voltage to exceed 13 kV.

TABLE III

| Sample | Void Filler | Conductive Layer | DEV (kV) |
| --- | --- | --- | --- |
| 5 | no | no | 6 |
| 6 | no | yes | 13 |
| 7 | yes | no | 11 |
| 8 | yes | yes | 20 |

These results clearly show the improvement is discharge extinction voltage when the termination includes both a void filler in the manner described above and a conductive layer in accordance with this invention.

As indicated above, a significant component of the present invention is the employment of the conductive layer of material 44 over a portion of the layer of semiconductive stress control material 30. The conductive layer of material 44 should have a surface resistivity of approximately less than about 50,000 ohms per square, preferably in the range from about 0.1 to about 5,000 ohms per square. The conductive layer may comprise, for example, a conductive paint, a conductive tape, or a conductive mastic (all conventional materials, well known to one skilled in the art). Typical conductive points comprise a print vehicle in which conductive particles such as metal particles, graphite or carbon black have been dispersed. Conductive tapes are generally prepared from polymeric materials containing dispersed conductive particles and conductive mastics comprise conventional mastic compositions to which conductive particles have been added. A metal foil can also be used if desired. In this case particular care must be taken to ensure a void free interface between the conductive layer and the stress control layer.

In the embodiment of the present invention illustrated by way of FIG. 2, provides for applying the conductive layer of material 44 as a paint directly onto the semiconductive stress control material 30. Other methods of applying the conductive layer of material 44 can be used. For example, the conductive layer can be provided as an internal layer on the insulating tube 42. Alternatively, the conductive material 44 may be positioned between layers 30 and 42 to form a three layer composite article to be applied to the termination.

The present invention, in summary, may be employed to control electrical stress due to a discontinuity in the electric field which produces a region of high electrical stress. Although specific embodiments of the present invention have been described herein, it will be obvious to those skilled in the art that various modifications may be made without departing from the spirit of this invention. With such included modifications, the present invention is suitable for employment with a wide variety of high voltage equipment, including joints, electrical bushings and feed throughs. With the foregoing in mind, it is understood that the invention be accorded the full scope of the appended claims.

I claim:

1. A method of terminating a high voltage cable comprising the steps of:
   (a) cutting back a cable jacket by a predetermined amount, leaving an exposed shield portion that includes a conductive layer;
   (b) cutting back an insulating layer of said cable by a predetermined amount, leaving an exposed length of a cable conductor for connection to a connector;
   (c) connecting the exposed length of conductor to a connector;
   (d) positioning a layer of semiconductive stress control material having a substantially uniform thickness over an exposed cut back portion of the insulation layer; and
   (e) providing an electrically conductive layer of material that overlies and is in contact with the semiconductive stress control material over the exposed shield portion and extending along the stress control material for a predetermined distance; and
   (f) applying an insulating layer over the stress control layer.

2. A method of claim 1, wherein the electrically conductive material is positioned between said stress control material and said insulating layer.

3. A method in accordance with claim 1, which further comprises the step of positioning a void filling composition at the end of the exposed shield portion prior to applying the layer of semiconductive stress control material.

* * * * *

UNITED STATES PATENT AND TRADEMARK OFFICE
CERTIFICATE OF CORRECTION

PATENT NO. : 4,551,915

DATED : November 12, 1985

INVENTOR(S) : Peter L. Larsson

It is certified that error appears in the above-identified patent and that said Letters Patent is hereby corrected as shown below:

Column 5, line 37, "1,601,612" should read -- 1,604,612 --.

Signed and Sealed this

Eighteenth Day of August, 1987

Attest:

DONALD J. QUIGG

Attesting Officer      Commissioner of Patents and Trademarks